US007866559B2

(12) United States Patent
Bi et al.

(10) Patent No.: US 7,866,559 B2
(45) Date of Patent: Jan. 11, 2011

(54) ID DOCUMENT STRUCTURE WITH PATTERN COATING PROVIDING VARIABLE SECURITY FEATURES

(75) Inventors: Daoshen Bi, Boxborough, MA (US);
Robert Jones, Andover, MA (US);
Tung-Feng Yeh, Waltham, MA (US);
Scott D. Haigh, Canton, MA (US)

(73) Assignee: L-1 Secure Credentialing, Inc., Billerica, MA (US)

( * ) Notice: Subject to any disclaimer, the term of this patent is extended or adjusted under 35 U.S.C. 154(b) by 102 days.

(21) Appl. No.: 12/136,681

(22) Filed: Jun. 10, 2008

(65) Prior Publication Data

US 2008/0272587 A1    Nov. 6, 2008

Related U.S. Application Data

(63) Continuation of application No. 11/025,786, filed on Dec. 28, 2004, now Pat. No. 7,383,999.

(51) Int. Cl.
*G06K 19/00*    (2006.01)
(52) U.S. Cl. .................. 235/487; 235/488; 235/380; 283/86
(58) Field of Classification Search .................. 235/487, 235/380, 375, 488; 283/86, 107, 111
See application file for complete search history.

(56) References Cited

U.S. PATENT DOCUMENTS 2,815,310 A    12/1957    Anderson (Continued)

FOREIGN PATENT DOCUMENTS

DE    3334009 A1    5/1985

(Continued)

OTHER PUBLICATIONS

Article entitled "Lenticular Prints," 6 printed pages, printed on Dec. 16, 2002 and accessed from http://www.shortcourses.com/how/lenticular/lenticular.htm.

(Continued)

*Primary Examiner*—Ahshik Kim
(74) *Attorney, Agent, or Firm*—Mintz Levin Cohn Ferris Glovsky and Popeo, P.C.

(57) ABSTRACT

A security feature for an identification document and method for making it provide layers of security, including, for example, tamper evidence, optically variable effects, and personalized information that links the security information to the document and its bearer. The feature is made by printing a first material representing first information on a core layer of the document. This first material at least partially overlaps the core layer. One example is Xerographic printing of information about the ID document applicant and the applicant's photo. The process also applies a second material representing second information adjacent to the first material. One example is ink jet printing of personal information with a UV curable ink in the form of a relief pattern on the core layer. Finally, the process applies a laminate layer over the core layer. The laminate layer covers the first and second materials. The first and second materials adhere differently to the laminate and core layers such that removal of the laminate layer from the core layer causes a separation of the first and second materials. The relief pattern is made to give the document a tactile feel as well as create optically variable effects.

26 Claims, 4 Drawing Sheets

U.S. PATENT DOCUMENTS

| | | | |
|---|---|---|---|
| 3,140,214 A | 7/1964 | Hofe | |
| 3,225,457 A | 12/1965 | Schure | |
| 3,455,768 A | 7/1969 | Neimeyer | |
| 3,496,262 A | 2/1970 | Long et al. | |
| 3,536,550 A | 10/1970 | Hofe | |
| 3,565,724 A | 2/1971 | Yamaguchi | |
| 3,625,801 A | 12/1971 | Reed et al. | |
| 3,658,629 A | 4/1972 | Cramer et al. | |
| 3,713,948 A | 1/1973 | Kluger | |
| 3,758,970 A | 9/1973 | Annenberg | |
| 3,886,032 A | 5/1975 | Artelt, Jr. | |
| 3,929,701 A | 12/1975 | Hall et al. | |
| 3,949,501 A | 4/1976 | Andrews et al. | |
| 3,953,869 A | 4/1976 | Wah Lo et al. | |
| 3,961,956 A | 6/1976 | Fukuda et al. | |
| 4,021,288 A | 5/1977 | Hannon et al. | |
| 4,025,380 A | 5/1977 | Bernardo | |
| 4,027,345 A | 6/1977 | Fujisawa et al. | |
| 4,029,537 A | 6/1977 | Kish | |
| 4,082,873 A | 4/1978 | Williams | |
| 4,121,003 A | 10/1978 | Williams | |
| 4,181,558 A | 1/1980 | Neubronner | |
| 4,184,701 A | 1/1980 | Franklin et al. | |
| 4,268,345 A | 5/1981 | Semchuck | |
| 4,272,311 A | 6/1981 | D'Angelo et al. | |
| 4,362,775 A | 12/1982 | Yabe et al. | |
| 4,417,784 A | 11/1983 | Knop et al. | |
| 4,448,631 A | 5/1984 | Eaton et al. | |
| 4,491,492 A | 1/1985 | Hetherington | |
| 4,505,772 A | 3/1985 | Renz | |
| 4,517,042 A | 5/1985 | Singer | |
| 4,522,670 A | 6/1985 | Caines | |
| 4,544,431 A | 10/1985 | King | |
| 4,585,509 A | 4/1986 | Obayashi | |
| 4,614,619 A | 9/1986 | Shannon | |
| 4,619,728 A | 10/1986 | Brink | |
| 4,637,896 A | 1/1987 | Shannon | |
| 4,650,536 A | 3/1987 | Ceraso | |
| 4,653,862 A | 3/1987 | Morozumi | |
| 4,680,079 A | 7/1987 | Tanaka | |
| 4,717,441 A | 1/1988 | Seki et al. | |
| 4,765,656 A | 8/1988 | Becker et al. | |
| 4,765,999 A | 8/1988 | Winter | |
| 4,773,677 A | 9/1988 | Plasse | |
| 4,832,783 A | 5/1989 | Nechay et al. | |
| 4,869,946 A | 9/1989 | Clay | |
| 4,876,123 A | 10/1989 | Rivera et al. | |
| 4,925,521 A | 5/1990 | Asbury, Jr. et al. | |
| 4,935,335 A | 6/1990 | Fotland | |
| 4,966,644 A | 10/1990 | Clark, Jr. et al. | |
| 4,985,096 A | 1/1991 | Bekker-Madsen | |
| 4,992,130 A | 2/1991 | Vermeulen et al. | |
| 5,005,872 A | 4/1991 | Lass et al. | |
| 5,058,926 A | 10/1991 | Drower | |
| 5,122,813 A | 6/1992 | Lass et al. | |
| 5,169,707 A | 12/1992 | Faykish et al. | |
| 5,171,625 A | 12/1992 | Newton | |
| 5,213,648 A | 5/1993 | Vermeulen et al. | |
| 5,267,755 A | 12/1993 | Yamauchi et al. | |
| 5,276,478 A | 1/1994 | Morton | |
| 5,301,981 A | 4/1994 | Nesis | |
| 5,310,222 A | 5/1994 | Chatwin et al. | |
| 5,334,573 A | 8/1994 | Schild | |
| 5,336,657 A | 8/1994 | Egashira et al. | |
| 5,336,871 A | 8/1994 | Colgate, Jr. | |
| 5,380,695 A | 1/1995 | Chiang et al. | |
| 5,387,013 A | 2/1995 | Yamauchi et al. | |
| 5,413,651 A | 5/1995 | Otruba | |
| 5,418,208 A | 5/1995 | Takeda et al. | |
| 5,458,713 A | 10/1995 | Ojster | |
| 5,463,212 A | 10/1995 | Oshima et al. | |
| 5,466,293 A | 11/1995 | Tanaka et al. | |
| 5,472,932 A | 12/1995 | Fujimura et al. | |
| 5,474,636 A | 12/1995 | Tisserand et al. | |
| 5,489,567 A | 2/1996 | Koshizuka et al. | |
| 5,492,370 A | 2/1996 | Chatwin et al. | |
| 5,560,799 A | 10/1996 | Jacobsen | |
| 5,579,694 A | 12/1996 | Mailloux | |
| 5,618,621 A | 4/1997 | Hasegawa et al. | |
| 5,629,093 A * | 5/1997 | Bischof et al. | 428/411.1 |
| 5,637,174 A | 6/1997 | Field et al. | |
| 5,643,389 A | 7/1997 | Kalisiak et al. | |
| 5,653,846 A | 8/1997 | Onodera et al. | |
| 5,653,929 A | 8/1997 | Miele et al. | |
| 5,658,411 A | 8/1997 | Faykish | |
| 5,660,925 A | 8/1997 | Cooley et al. | |
| 5,688,738 A * | 11/1997 | Lu | 503/227 |
| 5,697,006 A | 12/1997 | Taguchi et al. | |
| 5,712,731 A | 1/1998 | Drinkwater et al. | |
| 5,783,024 A | 7/1998 | Forkert | |
| 5,783,032 A | 7/1998 | O'Callaghan et al. | |
| 5,788,806 A | 8/1998 | Bradshaw et al. | |
| 5,844,230 A | 12/1998 | Lalonde | |
| 5,846,900 A | 12/1998 | Reiter et al. | |
| 5,856,048 A | 1/1999 | Tahara et al. | |
| 5,856,661 A | 1/1999 | Finkelstein et al. | |
| 5,895,552 A | 4/1999 | Matsuguchi | |
| 5,912,767 A | 6/1999 | Lee | |
| 5,928,788 A | 7/1999 | Riedl | |
| 5,958,528 A | 9/1999 | Bernecker | |
| 6,001,771 A * | 12/1999 | Nakano et al. | 503/227 |
| 6,003,581 A | 12/1999 | Aihara | |
| 6,007,660 A | 12/1999 | Forkert | |
| 6,016,225 A | 1/2000 | Anderson | |
| 6,049,055 A | 4/2000 | Fannash et al. | |
| 6,066,594 A | 5/2000 | Gunn et al. | |
| 6,073,854 A | 6/2000 | Bravenec et al. | |
| 6,095,566 A | 8/2000 | Yamamoto et al. | |
| 6,110,864 A | 8/2000 | Lu | |
| 6,146,032 A | 11/2000 | Dunham | |
| 6,146,741 A * | 11/2000 | Ogawa et al. | 428/32.39 |
| 6,159,327 A | 12/2000 | Forkert | |
| 6,176,522 B1 | 1/2001 | Jackson | |
| 6,179,338 B1 * | 1/2001 | Bergmann et al. | 283/86 |
| 6,183,018 B1 | 2/2001 | Braun et al. | |
| 6,185,042 B1 | 2/2001 | Lomb et al. | |
| 6,234,537 B1 | 5/2001 | Gutmann et al. | |
| 6,245,167 B1 | 6/2001 | Stein | |
| 6,264,782 B1 * | 7/2001 | Oshima et al. | 156/237 |
| 6,277,232 B1 | 8/2001 | Wang et al. | |
| 6,283,188 B1 | 9/2001 | Maynard et al. | |
| 6,284,337 B1 | 9/2001 | Lorimor et al. | |
| 6,301,363 B1 | 10/2001 | Mowry, Jr. | |
| 6,337,752 B1 | 1/2002 | Heckenkamp et al. | |
| 6,358,588 B1 | 3/2002 | Edwards et al. | |
| 6,372,341 B1 | 4/2002 | Jung et al. | |
| 6,418,154 B1 | 7/2002 | Kneip et al. | |
| 6,473,516 B1 | 10/2002 | Kawaguchi et al. | |
| 6,474,695 B1 | 11/2002 | Schneider et al. | |
| 6,576,309 B2 | 6/2003 | Dalgewicz, III et al. | |
| 6,596,360 B2 | 7/2003 | Toshine et al. | |
| 6,660,368 B2 | 12/2003 | Cooley | |
| 6,673,423 B2 | 1/2004 | Kranenburg-Van Dijk et al. | |
| 6,773,735 B1 | 8/2004 | Dalgewicz, III | |
| 6,791,590 B2 | 9/2004 | Misaizu et al. | |
| 6,803,114 B1 | 10/2004 | Vere et al. | |
| 6,817,530 B2 | 11/2004 | Labrec et al. | |
| 6,817,630 B1 | 11/2004 | Fischer et al. | |
| 6,827,277 B2 | 12/2004 | Bloomberg et al. | |
| 6,954,293 B2 | 10/2005 | Heckenkamp et al. | |
| 6,981,767 B2 * | 1/2006 | Schmitt et al. | 347/106 |
| 7,063,264 B2 | 6/2006 | Bi et al. | |
| 7,090,913 B2 | 8/2006 | Bourdelais et al. | |
| 7,131,380 B2 | 11/2006 | Huffer | |

| | | |
|---|---|---|
| 7,143,950 B2 | 12/2006 | Jones et al. |
| 7,383,999 B2 | 6/2008 | Bi et al. |
| 7,422,794 B2 | 9/2008 | LaBrec |
| 2002/0021001 A1 | 2/2002 | Stratford et al. |
| 2002/0146549 A1 | 10/2002 | Kranenburg-Van Dijk et al. |
| 2002/0182352 A1 | 12/2002 | Mitten et al. |
| 2002/0187215 A1 | 12/2002 | Trapani et al. |
| 2003/0038174 A1 | 2/2003 | Jones |
| 2005/0067497 A1 | 3/2005 | Jones et al. |
| 2005/0084693 A1 | 4/2005 | LaBrec |

FOREIGN PATENT DOCUMENTS

| | | |
|---|---|---|
| EP | 0116659 | 8/1984 |
| EP | 153547 A1 | 9/1985 |
| EP | 222446 A2 | 5/1987 |
| EP | 479295 A1 | 4/1992 |
| EP | 788085 A1 | 8/1997 |
| EP | 835739 A2 | 4/1998 |
| JP | 52119681 A | 10/1977 |
| JP | 63146909 | 6/1988 |
| JP | 4267149 A | 9/1992 |
| JP | 624611 | 2/1994 |
| WO | WO-89/07517 A1 | 8/1989 |

OTHER PUBLICATIONS

Bonny Lhotka, Karin Schminke, Dorothy Simpson Krause, "Lenticular Inkjet Printmaking", 2 printed pages, printed on Dec. 16, 2002 and accessed from http://www.dvpratt.com/evesmind/lentOver.htm.

Eastman, Product Data Sheet, Eastar Copolyester 5011, Dec. 7, 2004, 2 pages.

Eastman, Product Data Sheet, Eastar Copolyester 6763, Apr. 26, 2005, 4 pages.

Eastman, Product Data Sheet, Eastar Copolyester A150, Jun. 27, 2001, 3 pages.

Pct International Search Report, PCT/US 99/08833, Apr. 12, 1999.

PCT—International Search Report for International Application No. PCT/US02/40843, mailed on May 15, 2003.

PCT—Notification of Transmittal of the International Search Report or the Declaration, for International Application No. PCT/US02/40843, mailed on May 15, 2003.

Orasee company web page entitled "Welcome to Orasee Corporation", 2 printed pages, printed on Dec. 13, 2002 and accessed from: http://www.orasee.com/one/main.php3.

Robert Moran, "3-D Imagery", 3 printed pages, accessed and printed on Dec. 16, 2002 from http://www.flexography.org/flexo/article.cfm?ID=45.

* cited by examiner

ID DOCUMENT STRUCTURE WITH PATTERN COATING PROVIDING VARIABLE SECURITY FEATURES

RELATED APPLICATION DATA

This application is a continuation of application Ser. No. 11/025,786, filed Dec. 28, 2004 (now U.S. Pat. No. 7,383, 999), which is hereby incorporated by reference.

TECHNICAL FIELD

The invention relates to document laminate structures, such as those used in identification documents, and related methods for making these laminate structures.

BACKGROUND AND SUMMARY

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

For the purposes of this disclosure, ID documents are broadly defined herein, and include, e.g., credit cards, bank cards, phone cards, passports, driver's licenses, network access cards, employee badges, debit cards, security cards, smart cards (e.g., cards that include one more semiconductor chips, such as memory devices, microprocessors, and microcontrollers), contact cards, contactless cards, proximity cards (e.g., radio frequency (RFID) cards), visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

FIGS. 1 and 2 illustrate a front view and cross-sectional view (taken along the A-A line), respectively, of an identification (ID) document 10. In FIG. 1, the ID document 10 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint, a facial image or template, or iris or retinal template), a magnetic stripe (which, for example, can be on a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (also referred to as a substrate). In many applications, the core can be a light-colored, opaque material (e.g., TESLIN (available from PPG Industries), polyvinyl chloride (PVC) material, polyester, polycarbonate, etc.). The core 20 is laminated with a transparent material, such as clear PVC or polyester material 22, which, by way of example, can be about 1-5 mil thick. The composite of the core 20 and clear laminate material 22 form a so-called "card blank" 25 that can be up to about 30 mils thick. Information 26a-c is printed on the card blank 25 using a method such as Laser Xerography or Dye Diffusion Thermal Transfer ("D2T2") printing (e.g., as described in commonly assigned U.S. Pat. No. 6,066,594, which is incorporated hereto by reference in its entirety.) The information 26a-c can, for example, comprise variable information (e.g., bearer information) and an indicium or indicia, such as the invariant or nonvarying information common to a large number of identification documents, for example the name and logo of the organization issuing the documents. The information 26a-c may be formed by any known process capable of forming the indicium on the specific core material used.

To protect the information that is printed, an additional layer of transparent overlaminate 24 can be coupled to the card blank and printed information. Illustrative examples of usable materials for overlaminates include biaxially oriented polyester or other optically clear durable plastic film.

"Laminate" and "overlaminate" include, but are not limited to film and sheet products. Laminates used in documents include substantially transparent polymers. Examples of laminates used in documents include polyester, polycarbonate, polystyrene, cellulose ester, polyolefin, polysulfone, and polyamide. Laminates can be made using either an amorphous or biaxially oriented polymer. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers can vary and is typically about 1-20 mils. Lamination of any laminate layer(s) to any other layer of material (e.g., a core layer) can be accomplished using a lamination process.

In ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6,066,594, and 6,159,327. Other lamination processes are disclosed, e.g., in U.S. Pat. Nos. 6,283,188 and 6,003,581. A co-extruded lamination technology described in this document also appears in U.S. patent application Ser. No. 10/692,463. Each of these U.S. patents and applications is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

In a typical ID document, one or more laminate layers are joined together with the substrate, possibly including other security devices, such as holograms, integrated circuits, optical memory, RFID tag, etc. to form a complete document. These laminate layers are designed to enhance the durability and security of the identification documents. From the standpoint of durability, the laminate should increase the document's ability to withstand wear and tear experienced in the field, including heat and humidity that can compromise the integrity of the document structure.

From the standpoint of security, an identification document should be difficult to tamper with and/or provide clear evidence of tampering. In particular, the various layers of the document, including the laminate, should be difficult to separate or intrude into without severely damaging the document and marring the information contained in it.

This document describes novel security features for ID documents and methods for making these features and the documents that include them. Embodiments of these security features provide one or more layers of security, including: 1. variable (e.g., personal) information that links the feature to information on the card and its bearer; 2. optically variable effects that are difficult to reproduce; 3. a unique tactile feel on the surface of the document; 4. obvious tamper evidence and/or intrusion detection; and 5. use of ink formulations that enhance security, such as optical variance, fluorescence, invisible inks (e.g., UV or IR inks), etc.

One aspect of the invention is a method of making an identification document comprising applying a first material representing first information on a core layer of the document, the first material at least partially overlapping the core layer; applying a second material representing second information at least partially adjacent to the first material; and applying a laminate layer over the core layer. The laminate layer covers the first and second materials. The first and second materials adhere differently to the laminate and core layers such that removal of the laminate layer from the core layer causes a separation of the first and second materials. The second material represents the second information in a relief pattern having a varying surface height relative to a surface of the core such that the document has a tactile feel.

In one embodiment of the method, a manufacturing process prints a first material depicting first information on a core layer of the document. This first material at least partially overlaps the core layer. One example of this first printing stage is Xerographic printing of the bearer's information and photo. The process then applies a second material representing second information at least partially overlapping the first material, and cures the second material. One example is ink jet printing of personal information with a UV curable ink in the form of a relief pattern on the core layer. Finally, the process applies a laminate layer over the core layer. The laminate layer covers the first and second materials. The first and second materials adhere differently to the laminate and core layers such that removal of the laminate layer from the core layer causes a separation of the first and second materials.

Another aspect of the invention is a security feature for an identification document comprising a first material representing first information applied to a core layer of the document, a second material representing second information adjacent to the first material, and a laminate layer applied over the core layer. The laminate layer covers the first and second materials, and the first and second materials adhere differently to the laminate and core layers such that removal of the laminate layer from the core layer causes a separation of the first and second materials. The second material represents the second information in a relief pattern having a varying surface height relative to a surface of the core such that the feature has a tactile feel.

Additional aspects of the invention include ID documents and methods for making the ID documents and parts of ID documents.

BRIEF DESCRIPTION OF THE DRAWINGS

The advantages, features, and aspects of embodiments of the invention will be more fully understood in conjunction with the following detailed description and accompanying drawings, wherein.

Figure 1:
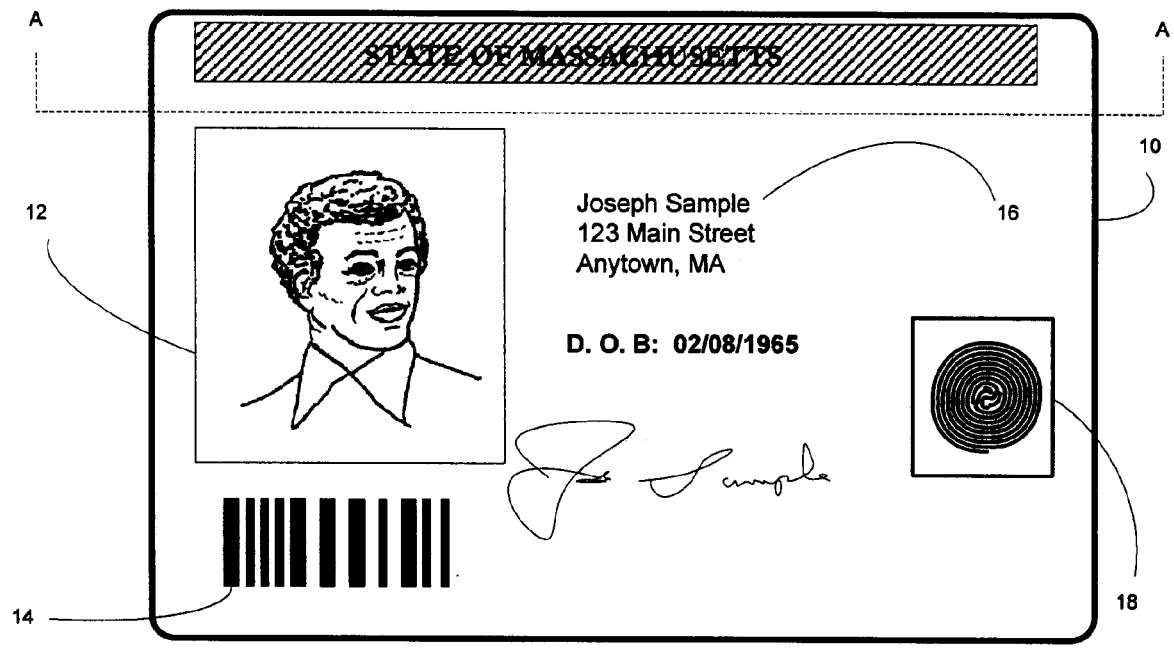
FIG. 1 is an illustrative example of an identification document.
Figure 2:
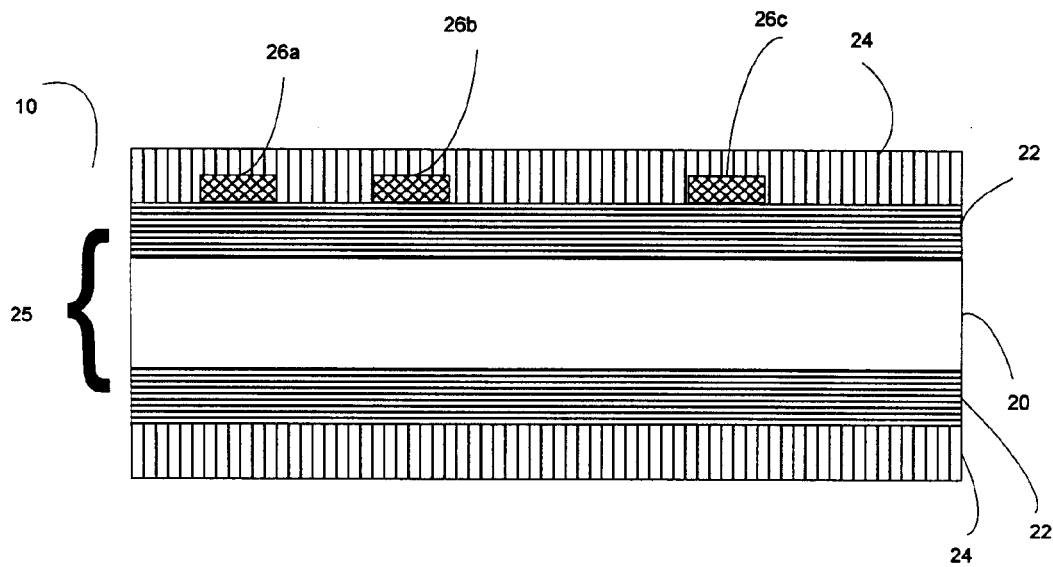
FIG. 2 is an illustrative cross section of the identification document of FIG. 1, taken along the A-A line.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

For purposes of illustration, the following description will proceed with reference to ID document structures (e.g., TESLIN-core or Polycarbonate-core, multi-layered ID documents). It should be appreciated, however, that the invention is not so limited. Indeed, as those skilled in the art will appreciate, the inventive techniques can be applied to many other structures formed in many different ways.

Figure 3:
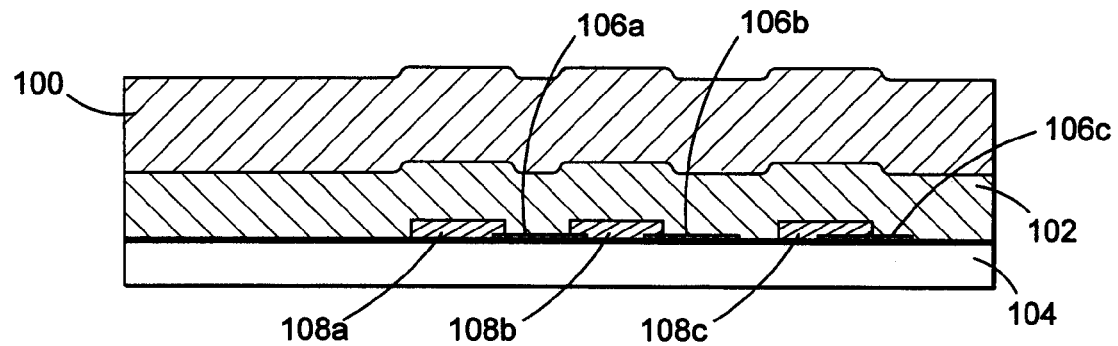
FIG. 3 is a diagram illustrating a cross section of an identification document including a coating between laminate and core layers creating a variable security feature.

FIG. 3 is a diagram illustrating a cross section of an identification document including a coating 108a-c between laminate and core layers creating a variable security feature. In this particular example, the coating 108a-c at least partially overlaps areas of a core layer 104 that have been pre-printed with information 106a-c. A laminate layer, which itself in this case, comprises two layers 100, 102 is applied to the core layer over the pre-printed information 106a-c and the coating 108a-c.

As shown from the cross sectional view, this particular embodiment uses materials and lamination that results in a raised pattern on the surface of the document over the portions of the document where the coating is applied. This raised pattern creates an additional security feature, namely, a tactile feel to the document's surface.

Figure 4:
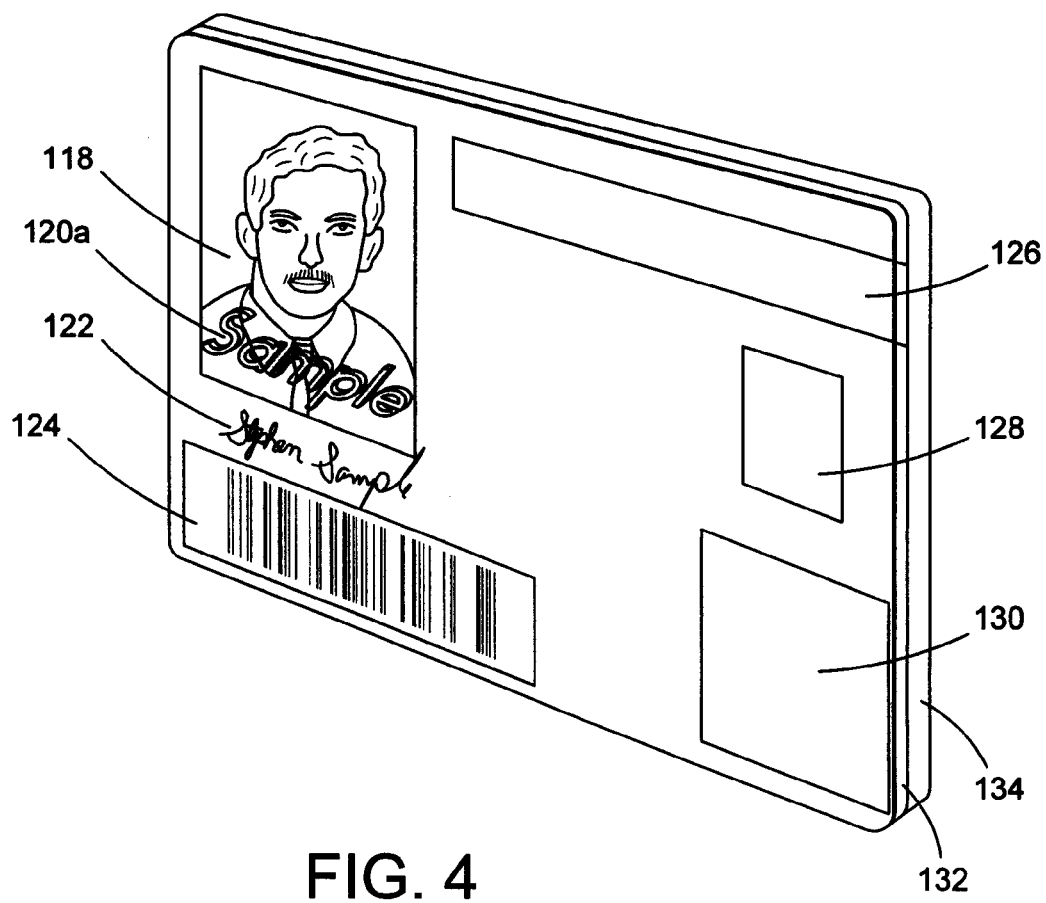
FIG. 4 is a diagram illustrating an example of an identification document with a variable security feature over a photo of the document's bearer.

To further demonstrate how this feature may be employed, FIG. 4 is a diagram illustrating a particular example of an ID document where the coating 120a is applied over the bearer's photo image 118 in between laminate 132 and core layers 134. The document of FIG. 4 includes information pre-printed on the core layer, such as the bearer's photo 118, bearer's signature 122, a bar code 124. In addition, it may include other elements such as biometric image (e.g. fingerprint) 126, ghost image 128 (e.g., in invisible, optically variable or fluorescing inks), and personal information of the bearer 130 such as name, DL number, date of birth, address, etc. Providing an additional layer of security through personalization, the coating represents variable data, such as an image, text or numbers that is personalized to the bearer (in this case, the coating comprises printed text representing the bearer's name, "sample" 120a).

Additional dimensions of security are achieved by forming the coating and laminate to create optically variable characteristics and by using materials and manufacturing methods to provide obvious evidence of intrusion and/or tampering of the identification document in the event that a counterfeiter attempts to remove the laminate layer 132.

Figure 5:
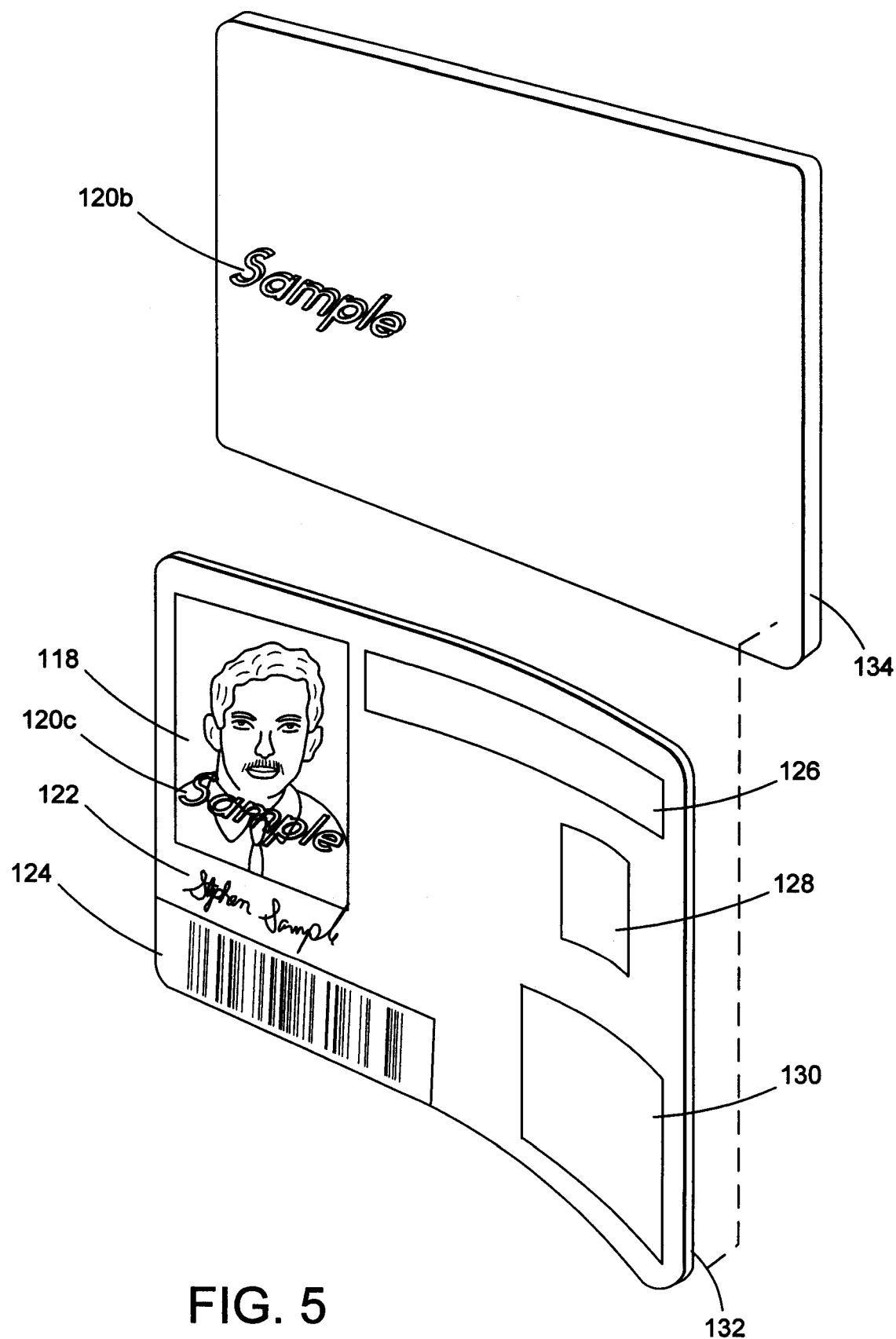
FIG. 5 is a diagram illustrating the tamper evident properties of the security feature shown in FIG. 4

To elaborate on the point, FIG. 5 is a diagram illustrating tamper evident properties of the coating shown in FIG. 4. In this example, the laminate layer 132 is torn away from the core layer 134. The coating material is selected such that it adheres more to one of these adjacent layers. Likewise, the pre-printed ink adheres more to the other of these layers. For example, to show the effect more dramatically, the coating (e.g., text "sample" 120b) adheres substantially more to the core layer 134, while the pre-printed information on the core adheres substantially more to the laminate layer 132. These properties produce the effect illustrated in FIG. 5. When torn away from the core, the laminate 132 takes with it substantially all of the pre-printed ink, except the pre-printed ink covered by the coating 120b, which remains on the core layer 134. Conversely, the core retains only the pre-printed ink that is protected by the coating. In addition, the raised text feature retains its tactile feel in the laminate, and becomes more visibly apparent due to the separation of the pre-printed ink under the coating from the pre-printed ink that adheres to the laminate.

In one embodiment of an ID card with this type of feature, our manufacturing process xerographically prints personal information on a base of TESLIN, which serves as a core layer. Ink jet print heads apply a coating of variable data in the form of a UV curable ink toner. The resultant cured coating of variable data is anchored to the TESLIN core by virtue of the monomers/oligomers penetrating the "fused" toner and having been cured via UV radiation. Additionally, the variable data (e.g., text/numbers) are raised proud of the image or surface of the TESLIN base to such an extent as to translate through the laminate to produce a duplicate raised pattern on the card's surface. To accomplish this, the ink jet material should be proud of the image/surface by at least 8 microns and preferably in the 10 to 20 micron. The tactile nature of the surface depends on the height of the printed/cured features on the core's surface.

The UV formulation is selected to obtain a high bonding of and through the fused toner images comprising the variable data. To enable intrusion detection in one embodiment, the cured composition has little or no adhesion to the innermost surface (usually adhesive) of the document's top laminate. In this case, the finished document has a top laminate that is essentially personalized with information specific to the individual. Additionally, with selection of the proper laminate/toner composition, the fact that the UV cured text/numbers have little or no adhesion to the laminate then allows an extremely discernable intrusion signal since the toner image covered by the UV cured material will remain totally intact and adhered to the core while the greater balance of the personalized data (image and text) will transfer or split or some combination of the two.

An example of a suitable laminate structure for use in this embodiment is a co-extruded laminate formed from two different polyester layers 100, 102. Additional polymer layers may also be included. A first laminate layer 100 forms the outer surface of the document structure. It comprises a first polyester material selected for its durability. In particular, a durable polyester material is selected that is highly chemically and mechanically resistant. One example of a polyester material with these properties is A150 PCTA material from Eastman Chemical. This particular polyester is one of the most durable, and is found to be chemically and mechanically resistant.

A150 Copolyester from Eastman is a poly(1,4-cyclohexylene-dimethylene terephthalate/isophthalate). It is produced by reacting terephthalic acid and isophthalic acid with the glycol 1,4-cyclohexanedimethanol.

A second laminate layer 102 of a different polyester material forms an inner surface of the laminate and has bonding properties for bonding the composite laminate structure directly to a TESLIN or polyester core 104. Examples of this second material include PETG 5011 or PETG 6763 from Eastman Chemical. PET refers to polyethylene terephthalate. PETG is also known as glycolised polyester, and the "G" represents glycol modifiers.

Copolyester 5011 from Eastman Chemical is a glycol modified polyethylene terephthalate(PET). The modification is made by adding a second glycol, cyclohexanedimethanol (CHDM) during the polymerization stages. The second glycol is added in the proper proportion to produce an amorphous polymer.

Copolyester 6763 from Eastman Chemical is a clear, amorphous material. Because of its clarity, toughness and good melt strength at processing temperatures, it is useful in a variety of processing techniques including film and sheet extrusion.

Both of these PETG polyesters bond well to a TESLIN core layer and act as an adhesive layer in this construction. Together, the different polyester materials form a composite laminate layer. This laminate layer is then bonded to the front and/or back of the core layer in the ID document. The ratio of A150 to 6763 or 5011 can be altered to optimize the performance.

Figure 6:
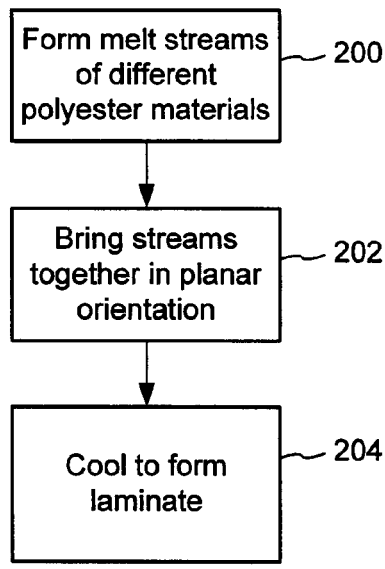
FIG. 6 is a flow diagram illustrating a method for creating a type of laminate shown in the example of FIG. 3.

FIG. 6 illustrates a process for making this type of composite laminate structure. The manufacturing process starts with the two different polyester materials that are melted to form two melt streams (200). Both melt streams are brought together in a planar orientation (202) and cooled to form a single laminate at the exit of the machine (204).

Figure 7:
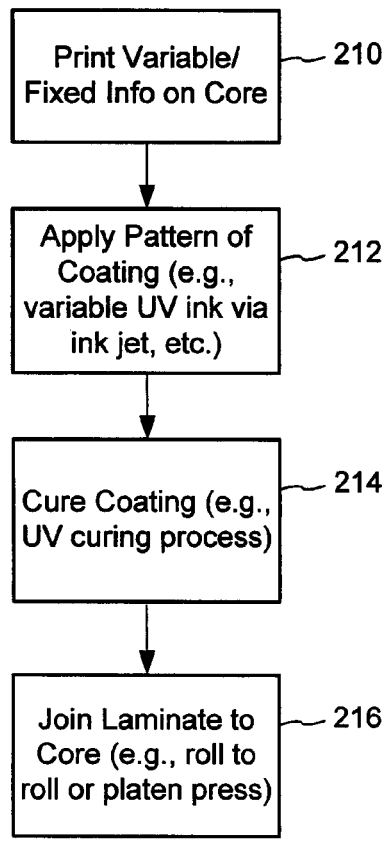
FIG. 7 is a flow diagram illustrating a method for creating an identification document with a variable security feature as shown in FIGS. 3-5.

FIG. 7 illustrates a method of making a document using the composite laminate structure. Variable and/or fixed information is printed on the core layer (210). In particular for TES- LIN core documents, for example, the TESLIN core is preprinted with preprinted inks, including covert UV/IR inks as described below.

The process of making the structure begins by printing a first layer of variable and/or fixed information on the core using a printing process (210), such as Xerographic printing or alternative method (e.g., liquid ink printing, ink jet, mass transfer, etc.). This printing process applies variable information of the document bearer, such as a facial image, name, address, birth date, and document number (Driver's License Number). This printing process may also apply fixed information to the core associated with the document issuer, such as a state graphic, logo, or seal.

In the context of central issue processing, the core is typically in the form of a sheet material, and different documents are printed on the sheet of core material as it moves through a first stage of printing. In central issue manufacturing, personal information from applicants is obtained at an enrollment site (e.g., a DMV site for driver's license issuance), and sent to a central issue manufacturing facility, where it is queued for printing on sheets of core material.

For over the counter issuance, the core may also be preprinted with information. However, the card stock is manufactured prior to enrollment, and is personalized at the time of enrollment in an "over the counter" enrollment process, where personal information is obtained and then printed on individual cards in an over the counter card printer.

Returning to the process in FIG. 7, the core material with pre-printed information is passed to a coating stage (212). In this stage, a different type of material is applied to the core over the pre-printed information. In one manufacturing approach for central issue, this material comprises a coating that conveys, at least in part, personal information of the bearer such as name, birth date, ID number, etc. In one particular central issue embodiment, the coating comprises a clear UV ink that is UV curable and applied via an ink jet printing process. Preferably, the coating is applied so that it overlaps the printing of the first printing stage, and in particular, so that it overlaps personalized printing (if present) already printed on the core. When ink jet printing machines are used to apply it, the coating can be applied in the form of personalized text, numbers or other graphics. Fixed information can be printed as well, such as the word "void" or some other text, graphics or numbers.

In one manufacturing system, the ink jet printer is implemented with a line of ink jet print heads that spray ink on a pre-printed sheet of core material as it passes the print heads. The approximate resolution of this printing is around 180 dots per inch (DPI), although the specific resolution may vary with the implementation. One type of print head technology for this application is Xaar ink jet print heads from Xaar, Plc. The system includes a bar code reader that reads a bar code on the sheet to identify the sheet and the information to be printed on it. The system then sends formatted personalized information to the ink jet printing mechanism. This formatted information corresponds to the individual ID documents already partially printed on the sheet.

Next, the manufacturing system applies a curing process compatible with the coating (214). For example, if the coating is a UV curable coating, the system performs a UV curing process. This curing process has the effect of bonding the coating to the core. For example, the UV curable ink includes monomers/oligomers that attach to the base complex of the core with the UV curing process. In addition, the curing process protects the coating during lamination, which involves application of heat and/or pressure to the surface of the core.

The manufacturing system joins a laminate layer to the core over the first and second printing layers (216). In the embodiment using UV ink, the system uses a roll to roll or platen press lamination process.

The co-extruded laminate described in this document may be used as the laminate. This co-extruded laminate is applied with heat and pressure, but without an adhesive due to the bonding properties of the laminate with the core material. As such, the laminate is joined directly to the front and/or back of the core. A roll-to-roll or platen press can be used to join the surface of the laminate with bonding property to the core. To create a platen press version, A150 is replaced by a polymer that does not crystallize under conditions typically found in a platen press process.

Roll to roll lamination is used to create the "tactile" transmission of the proud features through to the surface of the document. Press lamination renders the document's surface a duplicate of the finishing plate (e.g., flat).

Preferably, the pattern of the coating is applied in sufficiently high relief relative to the surface of the core such that the coating raises the surface of the laminate covering it after application of the laminate. This variation to of the surface height of the ID document provides additional security features. First, it creates a surface with a tactile feel corresponding to the raised pattern of the coating (e.g., raised text or graphic). In addition, if invisible ink such as UV (as above) or IR ink is used, the raised pattern is not visible when viewed from directly above it (i.e. a viewing angle roughly perpendicular with the surface of the document where the pattern resides). However, as the viewing angle changes, the relief pattern formed by the coating pattern reflects light in a manner that makes the pattern visible. As such, it also provides an optically variable device (OVD) feature.

The materials of the document structure (namely, the coating, core and laminate) are chosen to have certain image destruct and intrusion/tamper evident properties. For example, in the embodiment described above, the coating bonds more strongly to the core than the co-extruded laminate. Thus, when a counterfeiter attempts to remove the laminate, the pattern of the coating is evident in the laminate because its shape is physically impressed into it. However, the coating itself remains largely bonded to the core. Conversely, the first layer of printing (e.g., the Xerographic print) adheres more to the laminate, and thus, sticks to it. This feature enables one to clearly see the pattern of the coating in both the remaining core and the removed laminate. In the case of invisible ink coating, the pattern of the coating remains largely invisible (except for the OVD effects) until the laminate is separated from the core.

In one embodiment for central issue, our process uses the co-extruded laminate described above for both top and bottom card lamina and a TESLIN core, preprinted with bearer information and photo using a Xerox 2240 xerographic printer. In this case, the document structure is laminated at interface temperatures in excess of 280 F at standard pressures and line speeds of ~0.5 fpm at current configuration. Preprint patterns/coverage is limited around each card's perimeter to within a minimum of about 0.125"—thus ensuring an aggressive bond of the co-extruded laminate to the TESLIN core even at "intrusion" temperatures.

In one alternative embodiment, the coating is printed in the form of half tone image of the bearer. The image is printed such that the image translates through to the surface. The half tone image is created by using points of varying heights to convey points of varying "intensity".

In embodiments using transparent coatings, the natural optically variable properties of the coating structure/laminate structure are derivative of the fact that the cured compounds are transparent and are essentially equivalent to the lamina's index of diffraction. The text/numbers/images printed with the coating can be alternately seen and not seen by rotating the card so that light reflects off the protruding surfaces representing the text/numbers/or half tone images.

Another embodiment of this technology is to deposit the text/numbers in such a fashion as to be non-proud of the surface. In this case, the image destruct/intrusion detection mechanism is still active but the data are not visible.

Yet another embodiment of this technology lies in the use of a cured UV feature to form a lens at the card's surface. To create this lens structure, the coating material is deposited on the core in the shape of mounds or lanes (with rounded top surfaces). Cured and laminated, these features translate to the surface of the document, forming lenses capable of directing light to fixed or variable data printed underneath the ink jetted materials. Because the ink jet process is aligned with the laser printing process, one has an automatic registration of image(s) to the cellular feature sets laid down on them.

Other card structures can make use of the variable UV ink jet technology described herein. Using alternative laminate materials, such as TXP O/KRTY from Transilwrap Company, Inc., a similar manufacturing process is used to create a document structure that shows the feature's tactile and OVD properties. Alternative laminate/cured composition have can have differing sets of "intrusion obvious" characteristics. When selecting alternative laminate/first stage printing material/second stage coating material, the implementer should select a coating that is at least partially removed by the laminate or that has the opposite effect (e.g., the laminate is bonded well to a second stage coating and not at all to a first stage printed material at intrusion temperatures).

Non pigment containing toners with reasonably high melt temperatures (fuser temperatures) can also be used to create this feature. The toner must be selected so as to have bonding characteristics that are quite dissimilar to the ones used to fashion the image and variable data. Additionally, the lay down of the clear toner (perhaps multiple imaging in different cassettes) should be sufficient to cause translation of the feature through to the card's surface for OVD and tactile responses.

In any of the preceding embodiments, one can include UV or IR fluorescing agents into the formulations to create a feature that fluoresces when exposed to light in a particular band (visible or non-visible). Different color inks or dyes may be used to create color graphics and text in the coating. Different core materials such as polycarbonate may be used. Laminates with embedded security features may be used.

While the discussion above provides examples suitable for a central issue environment, where personalized information is available at the time of document manufacture, variations of the process may be used to create card stock used for over the counter issuance. For example, the coating may be applied to and cured on a pre-printed core (where the core is pre-printed with fixed information). One or more over-laminate layers and a D2T2 image receiver layer may be subsequently added over the cured material to enable the blank card to be printed with personal information at an over-the-counter issuance facility.

Table 1 below provides an example of a UV curable ink formulation that may be applied via ink jet printing to create the security feature described above. The viscosity of this fluid is about 10 cps. The last column explains the name of the material and where it comes from.

TABLE 1

| Hardcoat 012204B | | |
|---|---|---|
| Component | Weight (%) | |
| UVHC 8558 | 77 | Hard coat fluid from GE |
| SR 285 | 23 | tetrahydrofurfuryl acrylate monoer from Sartomer |

Table 2 provides another example of an alternative formulation that may be used to create the security feature.

TABLE 2

| Hardcoat 020404B | | |
|---|---|---|
| Component | Weight (%) | |
| CN 980 | 30 | Urethane acrylates ologomer from Sartomer |
| SR 399 | 38 | Multifunctional acrylate monomer from Sartomer |
| SR 285 | 26 | tetrahydrofurfuryl acrylate monoer from Sartomer |
| SR 1129 | 6 | Photoinitiator from Sartomer |

The composite laminate described above can be bonded to a polyester core layer. Upon lamination of the composite laminate to the polyester core, the resulting structure forms one solid piece of polyester in which intrusion is impossible because the interface is not discernable.

The embodiments detailed above are examples of how to mingle different polyester materials to achieve a synergistic effect that exceeds each material's properties. For example, A150 PCTA does not bond to a TESLIN core but is chemically and mechanically resistant, and 6763 and 5011 PETG bond well to the TESLIN core but are not as chemically or mechanically resistant.

The composite laminate structure is not limited to two layers, but instead, can be increased to additional layers, each contributing in durability and security.

While a coextrusion is illustrated, alternative processes may be used to join polyester layers into a composite laminate. These processes include roll-to-roll, extrusion coating, platen press, and injection/extrusion molding processes.

Other types of polymers may be used to create a coextruded laminate product as described above. The outer layer should have a durability property, such as properties that prevent cracking and/or aging. The inner layer forms a surface for bonding to a document layer, such as the core layer described above. It has a bonding property that facilitates direct bonding to the document layer. This inner layer is chemically related to/miscible with the laminate layer with which it is joined, e.g., by coextrusion to create the coextruded laminate. It is also chemically related to/miscible with the document layer to which it is joined as described. Bonding properties of the inner layer include, for example, its chemical relationship with the layer to which it is joined (e.g., they are miscible), its molar attraction to the layer to which it is joined, its degrees of melting and viscosity. For example, the inner bonding layer in the laminate has a different degree of melting and viscosity than the outer layer or layers providing durability that enable it to bond to the document layer to which the laminate is joined.

In the laminate structures described above, a laminate layer is selected that has a bonding property for bonding the laminate structure directly to document base materials without a separate adhesive layer. These document base materials include toners and inks printed on a TESLIN, polyester, copolyester, amorphous polyester, or like family substrates.

As illustrated above, coextrusion methods may be used to join two or more laminate layers into the laminate structure before direct bonding to the base materials. Each of these laminate layers can contribute desired durability and bonding properties for direct bonding to a document's base materials without adhesive. In coextrusion methods, a carrier layer is coextruded with one or more performance enhancing layers. In the example provided above, the carrier layer comprises a PCTA copolyester. This carrier provides durability performance while the enhancement layers (e.g., PETG, etc.) provide bonding performance that increase the security of the identification document by avoiding the need for an adhesive layer between the laminate and document base material. Other materials can be used as the carrier layer, and a material acting as a carrier in one embodiment may act as an enhancement layer in other embodiments.

A list of materials that may be combined with a carrier layer by coextrusion to provide a bonding property that enhances bonding performance with base materials of inks, toners, and core TESLIN, polyester, copolyester, amorphous polyester, or like family substrates, includes, but is not limited to: SURLYN, mLDPE, EVA, EEA, and EMA.

A list of materials that provide a durability property for enhancing durability performance, either as a carrier or enhancement layer, include, but are not limited to: LDPE, HDPE, PP, and LLDPE. Members of this particular family can also be used as bonding layers coupled with one of the others in this family as the carrier.

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

A CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if large volumes of ID documents are manufactured.

U.S. patent application Ser. No. 10/325,434 (now U.S. Pat. No. 6,817,530), which is hereby incorporated by reference, describes approaches for manufacturing identification documents in a central issue process.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process is by its nature can be an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5-2.0 mil (13-51.mu.m) poly(vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6.mu.m) overlay patches applied at the printhead, holographic hot stamp foils (0.125-0.250 mil 3-6.mu.m), or a clear polyester laminate (0.5-10 mil, 13-254.mu.m) supporting common security features. These last two types of protective foil or laminate sometimes are applied at a laminating station separate from the printhead. The choice of laminate dictates the degree of durability and security imparted to the system in protecting the image and other data.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents. Further, instead of ID documents, the inventive techniques can be employed with product tags, product packaging, business cards, bags, charts, maps, labels, etc., etc. The term ID document is broadly defined herein to include these tags, labels, packaging, cards, etc.

It should be understood that various printing processes could be used to create the identification documents described in this document. It will be appreciated by those of ordinary skill in the art that several print technologies including but not limited to indigo (variable offset) laser xerography (variable printing), offset printing (fixed printing), inkjet (variable printing), dye infusion, mass-transfer, wax transfer, variable dot transfer, laser engraving can be used to print variable and/or fixed information one or more layers of the document. The information can be printed using dots, lines or other structures of varying colors to form text or images. The information also can comprise process colors, spot or pantone colors.

It should be understood that, in the Figures of this application, in some instances, a plurality of method steps may be shown as illustrative of a particular method, and a single method step may be shown as illustrative of a plurality of a particular method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. A method of making an identification document comprising:
    applying a first material representing first information on a core layer of the document, the first material at least partially overlapping the core layer;
    applying a second material representing second information at least partially adjacent to the first material;
    applying a laminate layer over the core layer, the laminate layer covering the first and second materials, wherein the first and second materials adhere differently to the laminate and core layers such that removal of the laminate layer from the core layer causes a separation of the first and second materials; wherein the second material represents the second information in a relief pattern having a varying surface height relative to a surface of the core such that the document has a tactile feel.

2. The method of claim 1 wherein the second material comprises a coating.

3. The method of claim 2 wherein the coating is applied with an ink jet.

4. The method of claim 1 wherein the second material is cured, the curing comprising UV curing.

5. The method of claim 1 wherein the first information includes variable information associated with a bearer of the document.

6. The method of claim 5 wherein the variable information comprises an image of the bearer.

7. The method of claim 1 wherein the second information includes variable information associated with a bearer of the document.

8. The method of claim 1 wherein the relief pattern provides an optically varying effect when viewed at different viewing angles.

9. The method of claim 8 wherein the second material comprises a material that renders the second information not readily visible when viewed from a viewing angle approximately perpendicular to the surface of the document, the second information becoming visible when viewed from a viewing angle other than approximately perpendicular to the surface of the document due to the relief pattern.

10. The method of claim 1 wherein the second material comprises a non-visible ink.

11. The method of claim 10 wherein the non-visible ink becomes visible when radiated with light in a non-visible band.

12. The method of claim 1 wherein the second material is applied on the core layer to form a lens capable of directing light to the first information.

13. A security feature for an identification document comprising:
    a first material representing first information applied to a core layer of the document, the first material at least partially overlapping the core layer;
    a second material representing second information adjacent to the first material; and
    a laminate layer applied over the core layer, the laminate layer covering the first and second materials, wherein the first and second materials adhere differently to the laminate and core layers such that removal of the laminate layer from the core layer causes a separation of the first and second materials; wherein the second material represents the second information in a relief pattern having a varying surface height relative to a surface of the core such that the feature has a tactile feel.

14. The security feature of claim 13 wherein the second material comprises a coating.

15. The security feature of claim 14 wherein the coating is applied with an ink jet.

16. The security feature of claim 13 wherein the second material is cured with a UV curing.

17. The security feature of claim 13 wherein the first information includes variable information associated with a bearer of the document.

18. The security feature of claim 13 wherein the variable information comprises an image of the bearer.

19. The security feature of claim 13 wherein the second information includes variable information associated with a bearer of the document.

20. The security feature of claim 13 wherein the relief pattern provides an optically varying effect when viewed at different viewing angles.

21. The security feature of claim 20 wherein the second material comprises a material that renders the second information readily visible when viewed from a viewing angle approximately perpendicular to the surface of the document, the second information becoming visible when viewed from a viewing angle other than approximately perpendicular to the surface of the document due to the relief pattern.

22. The security feature of claim 13 wherein the second material comprises a non-visible ink.

23. The security feature of claim 22 wherein the non-visible ink becomes visible when radiated with light in a non-visible band.

24. The security feature of claim 13 wherein the second material is applied on the core layer to form a lens capable of directing light to the first information.

25. The security feature of claim 13 wherein the second information represents fixed information associated with the issuer of the identification document.

26. The security feature of claim 13 wherein the first and second information represents variable information associated with a bearer of the identification document.

* * * * *